United States Patent [19]

Williams et al.

[11] 4,205,323
[45] May 27, 1980

[54] PAPER FEED CONTROL

[75] Inventors: George C. Williams, S. Easton; Edward W. Fay, W. Bridgewater, both of Mass.

[73] Assignee: Alden Research Foundation, Brockton, Mass.

[21] Appl. No.: 929,403

[22] Filed: Jul. 31, 1978

[51] Int. Cl.² ............................................. G01D 15/24
[52] U.S. Cl. .................................... 346/165; 346/79; 346/101
[58] Field of Search ............... 346/165, 163, 162, 136, 346/101, 79

[56] References Cited

U.S. PATENT DOCUMENTS

| | | | |
|---|---|---|---|
| 2,683,111 | 7/1954 | Greig | 346/101 |
| 2,910,666 | 10/1959 | Hardgrove | 346/101 |
| 3,293,653 | 12/1966 | Amada | 346/101 |
| 3,335,221 | 8/1967 | Barnes | 346/101 |
| 3,778,842 | 12/1973 | Saito | 346/136 |
| 3,810,192 | 5/1974 | Okabe | 346/133 |
| 3,854,145 | 12/1974 | Carroll, Jr. | 346/136 |
| 3,990,083 | 11/1976 | Webster | 346/136 |

*Primary Examiner*—John H. Wolff
*Attorney, Agent, or Firm*—James H. Grover

[57] ABSTRACT

The resolution of an image that is produced by a graphic recorder is related to the rate that recording paper passes through a recording zone and the sweep rate is related to the rate at which a scanning electrode contacts the recording paper. According to the present invention, both the sweep rate and the resolution are simultaneously coordinated through the use of a ratchet wheel and pawl that are interconnected between the scanning electrode and feed rolls. The ratchet wheel is indexed through the movement of the scanning electrode and as the scanning electrode makes a sweep, the feed rolls are indexed by successive or multiply successive teeth in the ratchet wheel. An anti-backlash device is associated with the ratchet wheel to prevent the ratchet wheel and the feed rolls from reversing themselves during operation of the recorder.

11 Claims, 4 Drawing Figures

PAPER FEED CONTROL

BACKGROUND OF THE INVENTION

In the present invention a scanning electrode is passed in opposition to a linear, blade-like electrode in a recording zone with a moving sheet of electrolytic paper disposed therebetween. As is well known in the facsimile art, the scanning electrode can take the form of a torsionally twisted helical shape disposed upon a rotatable drum. The drum is rotated while facsimile signals are applied to the two electrodes and the paper disposed therebetween is marked at the pressure point between them. From time to time, a transmitter may send signals which necessitate a different rate of feed before the scanning electrode. For example, when images without any great deal of information are being transmitted it may be desirable to use a course rate of feed. In other instances different transmitters may send signals which utilize different sweep rates and the equipment must be capable of receiving such signals. In addition, to produce an acceptable hard copy image the paper must be tightly disposed in the recording zone between the paper supply and the feed rolls which draw it from the supply. That is, the feed rolls must not slip while the scanning electrode is passing across the paper to place a graphic image thereon and the paper must be drawn from the cassette at predetermined time intervals.

DESCRIPTION OF THE PRIOR ART

In many graphic recorders using a pair of opposed electrodes, a web of paper is tightly gripped between two rollers, one of which is driven and the other of which is an idler. The driven roller is rotated at a rate which is directly related to the sweep rate of the scanning electrode and will cause the paper to advance through the recording zone at a predetermined rate which has been dictated by the transmitter as is necessary for the required marking density along the length of the web. In general the feed roll was driven with a motor that was synchronized to a speed which would precisely and accurately draw the paper from the supply. When transmissions had to be received at several rates, the prior art usually resorted to stepping motors, gear boxes with selectable output rates, multi-speed motors or even a plurality of motors. The addition of these motors or gear boxes becomes quite costly as the number of recording rates or marking densities increase due to the number of different types of transmissions.

SUMMARY OF THE INVENTION

According to the present invention, a wide variety of different recording rates and vertical marking densities can be provided through the use of a mechanical drive which includes a ratchet wheel affixed to a driven feed roller. A ratchet wheel is incrementally indexed by a cam that is eccentrically disposed upon the axis of the shaft of a drum that supports the scanning electrode. The feed roll is indexed successive or multiply successive lines by the ratchet wheel at a predetermined time by means of a pawl. The tongue end of the pawl registers with the teeth of the ratchet wheel and the other end engages the eccentric cam. During a revolution of the scanning electrode, the pawl is struck with the eccentric can which indexes the feed roll through the ratchet. In a preferred embodiment, a stop is associated with the pawl and is disposed so that the pawl will engage one tooth of the ratchet wheel or can engage one while successively skipping a predetermined number of others. Through the use of the stop, the vertical printing density in the recording zone can be changed since the stroke of the pawl can be established to engage successive or multiply successive teeth of the ratchet wheel. Upon establishing the tooth engagement combination, the advancement rate of the paper through the recording zone is a function of the rate of rotation of the cam associated with the scanning electrode while the vertical printing density remains constant. As the scanning electrode is rotated faster or slower, the ratchet wheel will be engaged more or less frequently by the pawl.

To insure successive engagement of the teeth of the ratchet wheel by the pawl, the feed rolls must not slip backwards. To prevent such slippage, an anti-backlash device is associated with the ratchet wheel and preferably takes the form of a frictionaly engaging polymeric screw which is mounted upon a brace bar and rubs against the ratchet wheel to prevent backwards movement.

The graphic recorder includes a frame which defines a recording zone with a scanning electrode and a linear electrode. The paper is held in a supply holder and feed rollers are used to draw the paper through the recording zone. The ratchet wheel is connected to the driven feed roller and it is indexed at a predetermined time during the scan by a pawl which is interconnected between the ratchet wheel and the scanning electrode. The eccentric rotational cam is connected to the scanning electrode and the extreme of eccentricity of the cam is predetermined so that when the extreme is reached, the driven feed roll will be advanced by the ratchet. In a preferred embodiment, a stop is associated with the pawl which predetermines engagement of successive of multiply successive teeth of the ratchet wheel thereby increasing or decreasing the vertical printing density in the recording zone.

DESCRIPTION

Figure 1:
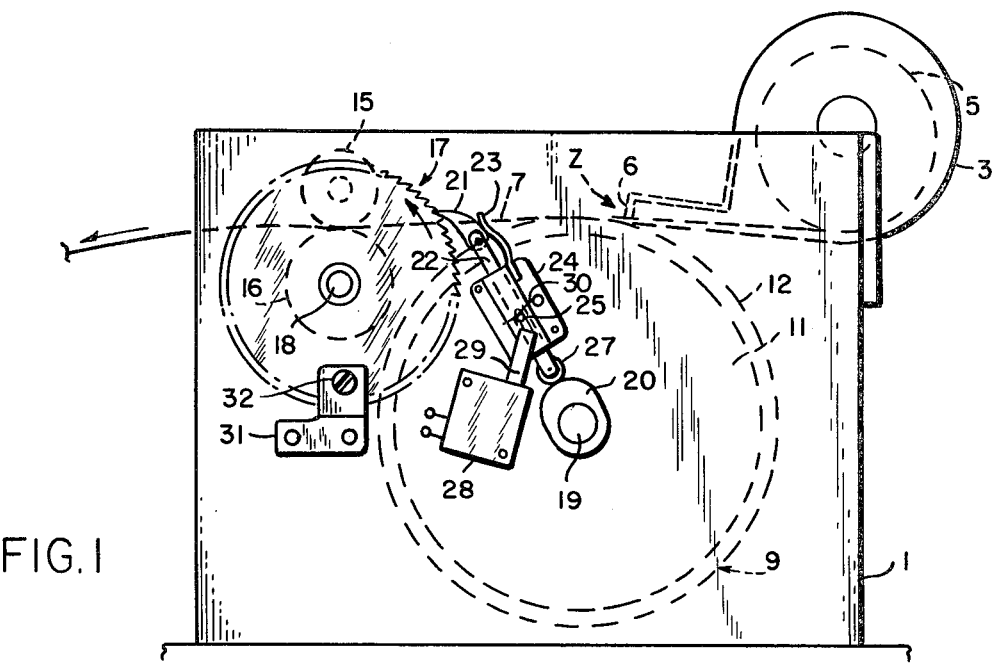
FIG. 1 is a side elevational view of the electric graphic recorder according to the invention.
Figure 2:
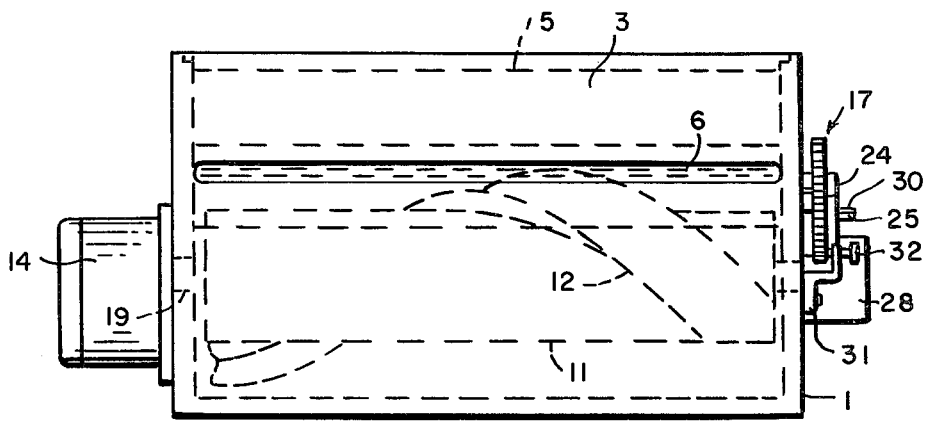
FIG. 2 is a front elevational view of the recorder of FIG. 1.

As shown in FIGS. 1 and 2, one form of a facsimile recorder according to the present invention comprises a base frame 1 which receives a cassette 3 that holds a supply of recording web 5. The cassette 3 comprises a generally cylindrical housing from which the leading end of the recording web 7 is drawn on a path through the cassette exit formed between upper and lower lips. One leg of a linear electrode 6 is attached to the upper lip and is of an L-shaped cross section. The other leg extends in front of the mouth of the cassette and forms a linear recording edge in opposition to a helical scanning electrode 9. The linear and scanning electrodes cooperate to mark the electrolytic paper web 7 in recording zone Z as electrical signals are applied. Preferably signals are supplied to the linear electrode through register pins (not shown) which fit through perforations in each end of the linear electrode and position the linear electrode 6 transversely with respect to the axis of the recording drum 9 and the path of the recording web 7. Alternatively the linear recording edge can be seated in detents on the frame to provide the same function.

The scanning electrode 9 is formed of a cylindrical drum 11 of insulating material rotated in the direction of the arrow during operation of motor 14. Helically curved around the drum is a metal strip which has an outer edge that presses through the recording paper against the linear electrode 6 at a spot. Preferably the strip 12 is an elongate shape, 0.003 to 0.005 inches thick and formed of stainless steel or beryllium copper. The strip 12 is partially folded lengthwise at about 45° and notches are cut wholly through the center from the crease of the fold leaving a flexible bridge below the recording edge of the electrode. The strip 12 can be supported in a groove in the surface of the drum that extends helically from one edge to the other so that with one revolution of the drum any segment of the recording edge will touch the recording web only once.

The web 7 is drawn from the cassette 3 by driven roller 16 and idler roller 15 through recording zone Z. A ratchet wheel 17 is fixedly disposed on a shaft 18 which is axially disposed on driven roller 16 and movement of ratchet wheel 17 in the direction of the arrow pulls the recording web 7 from the cassette 3.

Recording drum 9 is journaled within frame 1 by axial shaft 19 which is attached at one end to motor 14 and at the other end to eccentric cam 20. As recording drum 12 revolves in the direction of the arrow, it carries eccentric cam 20 which urges against the pawl that in turn indexes ratchet wheel 17 in the direction of the arrow.

The pawl includes a tongue 21 which is pivotably disposed on shaft 22 and urged against the ratchet wheel 17 by means of spring 23. Shaft 22 is slidably received within housing 24 and can freely move within the limits afforded by cam 20. A stop 25 is disposed on the side of shaft 22 and extends through a slot 26 that is formed on the side of housing 24.

A wheel 27 is disposed at the end of the shaft 22 opposite the tongue 21 and follows as the cam 20 and drum 9 revolve. The stop 25 and hence the shaft 22 is continually urged towards the cam 20 by a spring 30 thereby forcing the tongue 21 to return to the next indexing point as the cam 20 moves from its extreme of eccentricity.

As can be readily appreciated, the rate of revolution of the drum 9 directly effects the rate of revolution of the cam 20 which in turn directly effects the rate that the pawl is actuated to drive the ratchet wheel 17. Hence the web of recording paper 7 will be drawn through the recording zone Z at a rate which is predetermined by the speed of drum 9.

Figure 3:
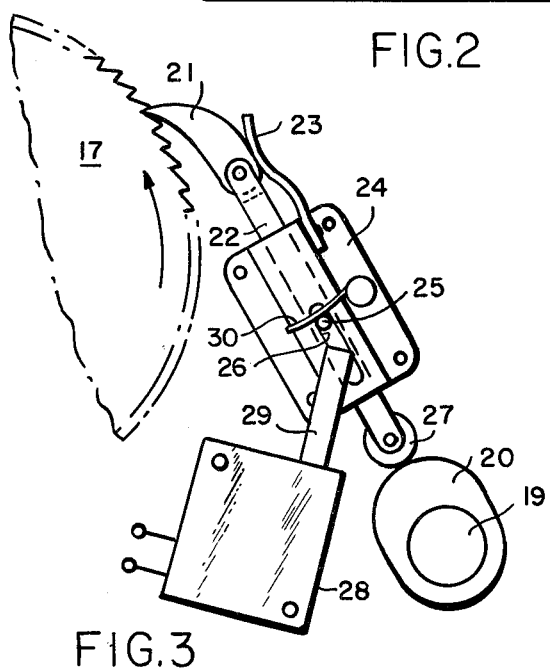
FIGS. 3 and 4 are enlarged views of the ratchet wheel and pawl showing in particular their interrelation to the cam disposed on the recording drum.
Figure 4:
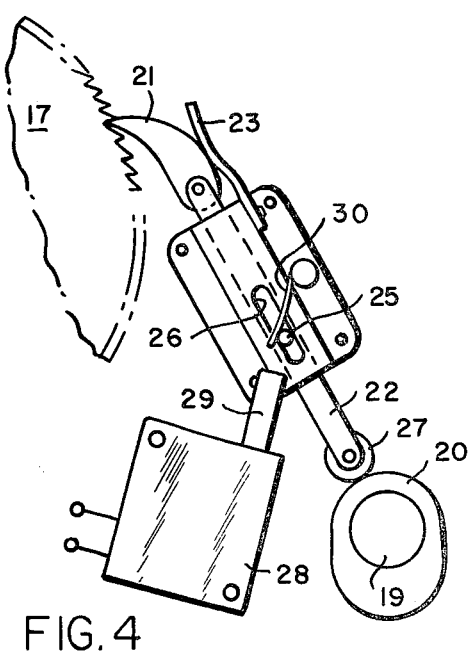

As was previously discussed, from time to time, the transmitter may predetermine to use a courser rate of feed which provides less scan lines per inch of recording paper, especially when there is a lack of detail on the copy being sent. The predetermined travel of the pawl is limited by a solenoid 28 that can interpose an arm 29 into the downward path of the stop 25. If arm 29 is extended from solenoid 28, the downward travel of pawl is limited to a distance equal to movement of one ratchet tooth, as shown in FIG. 3, which is the equivalent of one line of scan. If, on the other hand, arm 29 is retracted, the downward travel of the pawl is limited by the distance that cam 20 will allow wheel 27 to move. In that case, as shown in FIG. 4, the ratchet wheel can be indexed by two teeth which is the equivalent of two lines of scan. In addition, more then one solenoid can be disposed in relation to stop 25 thereby allowing indexing even more than two ratchet teeth, thereby producing less scan lines on any given segment of recording paper.

As was previously discussed, it is important that the web of paper 7 be tautened in the recording zone Z. If the paper 7 is not taut the graphic information recorded upon it will become blurred. The tension is caused by the cooperative efforts of the driven roller 16 and the lips of the mouth of the cassette 3 which urge against the paper thereby preventing unrolling unless the driven roller revolves. Since there is tension between the rollers and the cassette, it is important to prevent the rollers from reversing themselves during operation of the equipment because the pawl might index back into the same ratchet tooth. To prevent such reindexing we provide an anti-backlash device 31 which includes a polymeric screw 32 that frictionally engages the side of ratchet wheel 17 and allows movement only when tongue 21 forces the ratchet wheel 17 forward.

It is apparent that modifications and changes can be made within the spirit and scope of the present invention. It is our intention only to be limited by the scope of the appended claims.

We claim:

1. A graphic recorder of electrical signals comprising:

means defining a recording zone and including a linear electrode in combination with a scanning electrode which is disposed on a drum that rotates on a drum shaft;

means for holding a supply of recording paper;

feed roll means having a feed roll shaft disposed therein to draw said recording paper through the recording zone;

a ratchet wheel fixedly mounted on said feed roll shaft whereby when said ratchet wheel is rotated, said feed roll means is turned;

means to index said ratchet wheel including a pawl engaging at least one tooth of said ratchet wheel, said pawl being disposed on a pawl shaft;

an eccentric cam disposed on said drum shaft, means causing said pawl shaft to follow said eccentric cam whereby when an extreme of eccentricity is reached, the feed roll means will be advanced stepwise.

2. The graphic recorder according to claim 1 further including stop means associated with said indexing means arranged to advance said ratchet wheel through one or multiple successive ratchet wheel teeth and cause the feed roll means to be advanced corresponding.

3. The graphic recorder according to claim 1 further including anti-backlash means, frictionally engaging the ratchet wheel and preventing said feed roll from rotating in a direction opposite to the direction of drive of the indexing means.

4. A graphic recorder of electrical signals comprising:

means defining a recording zone and including a scanning electrode whereby recording indicia is produced and a linear electrode;

means for holding a supply of recording paper;

feed roll means to draw paper through the recording zone;

ratchet wheel means disposed on a shaft disposed within said feed roll means;

pawl means selectively engaging at least one tooth of said ratchet means to index said feed roll means;

stop means associated with said pawl and cooperating cam means to index said ratchet means into successive or multiply successive teeth whereby the paper is advanced one or more scan lines.

5. The graphic recorder according to claim 4 wherein said cam is eccentric and is connected to said scanning electrode, an extreme of eccentricity of said cam being predetermined, whereby when the extreme is reached, the feed roll will be advanced by the ratchet means.

6. The recorder according to claim 5 wherein the scanning electrode is disposed upon a drum with a shaft centrally disposed therein, and said eccentric rotational means is disposed upon the shaft.

7. The graphic recorder according to claim 5 wherein the pawl means includes a tongue connected to one end of a shaft, said tongue registering with at least one tooth of said ratchet means and further wherein said stop means is disposed on said pawl shaft, said stop means being operatively associated with an engagement means which sets the indexing at one or multiply successive ratchet wheel spacings.

8. The graphic recorder according to claim 7 wherein said engagement means includes a solenoid connected to a receiver to predetermine the number of ratchet wheel spacings that are advanced.

9. The graphic recorder according to claim 7 wherein further including anti-backlash means frictionally preventing said feed roll from rotating in a direction opposite to the direction of drive of the indexing means.

10. The graphic recorder according to claim 9 wherein the anti-backlash means is a resilient member arranged to engage the side of said ratchet wheel.

11. The recorder according to claim 4 wherein said pawl includes a tongue pivotably attached to a shaft, said shaft being journaled in a housing;

spring means urging said tongue towards said ratchet wheel; and said stop being disposed on said shaft and extending through an aperture in the housing, spring means urging said stop in a direction opposite to the direction of travel of said ratchet wheel.

* * * * *